(No Model.)

H. O'NEAL KING.
ICE CREAM FREEZER.

No. 273,107. Patented Feb. 27, 1883.

WITNESSES.
P. J. Finney
H. I. Luman.

INVENTOR.
Hezekiah O'Neal King
By H. N. Jenkins
ATTORNEY

UNITED STATES PATENT OFFICE.

HEZEKIAH O'N. KING, OF GREENVILLE, SOUTH CAROLINA, ASSIGNOR TO GASTON TURNER RAOUL, OF NEW ORLEANS, LOUISIANA.

ICE-CREAM FREEZER.

SPECIFICATION forming part of Letters Patent No. 273,107, dated February 27, 1883.

Application filed May 16, 1882. (No model.)

*To all whom it may concern:*

Be it known that I, HEZEKIAH O'NEAL KING, a resident of the town of Greenville, county of Greenville, and State of South Carolina, have invented a certain new and useful Improvement in Ice-Cream Freezers; and I do hereby declare the following to be a full, clear, and correct description of the same, reference being had to the annexed drawings, making a part of this specification.

The object of my invention is to furnish an improved automatic ice-cream freezer in which cream can be hard frozen with a comparatively small quantity of ice, and without further labor than that involved in the filling of the receptacle.

My invention consists in a cream-receptacle having an exterior and interior annular wall, the area inclosed by the latter being open at both its top and bottom ends, so that the cream-receptacle can be withdrawn without removing or carrying with it the freezing material placed within the inner chamber thereof.

My invention also consists in providing the cream-receptacle with a detachable cover having a central opening and downwardly-curved flange, in order that during the process of filling the inner receptacle the freezing material may be prevented from accidentally dropping into the cream.

My invention further consists in the combination, with an ice-cream freezer, of a tray or cover for holding ice on or above the cream-receptacle.

My invention further consists in the combination of parts, as will be hereinafter more fully set forth.

Figure 1:
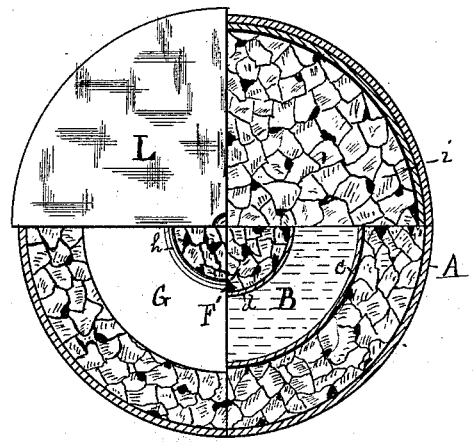
Figure 2:
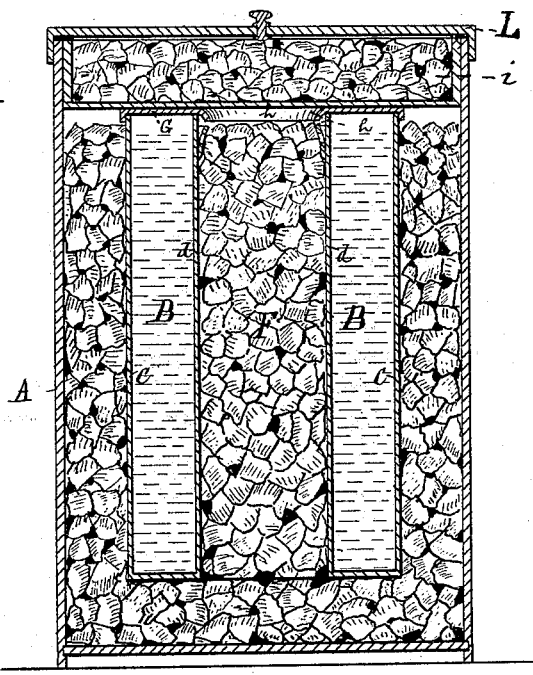
Figure 3:
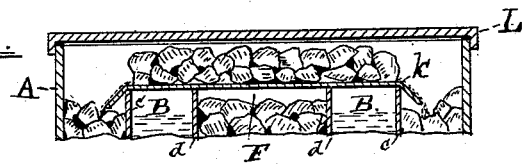

On the drawings, Figure 1 shows a top view of my improved freezer. This figure is divided by cross-lines into four parts, one representing a section of the top cover, another a section of the tray and outer casing, another a top view of the detachable cover and inner and outer freezing-receptacles, and the fourth a section of the cream and freezing receptacles. Fig. 2 is a vertical section of the freezer and the different parts thereof. Fig. 3 is a modification of Fig. 2.

On the drawings, the letter A represents the outer casing. B is the annular cream-receptacle, which is formed with an exterior wall, c, interior wall, d, and annular bottom. The area F, inclosed by the interior wall, is open at both top and bottom, so that freezing material may be placed therein and the cream-receptacle withdrawn, when desired, without removing the aforesaid freezing material. A detachable cover, G, having a central opening and downwardly-curved flange h, is fitted to the top of the cream-receptacle, on which it is placed before the process of packing the freezing-receptacles, the object being to guard against the accidental passage of the freezing material into the cream-receptacle. If so desired, this cover can be removed after the aforesaid receptacles have been filled. A tray, i, or cover k is next placed above the cream-receptacle, and the said tray or cover loaded with the freezing material, as shown in Figs. 2 and 3. The cover k has its outer edge provided with a downwardly-projecting flange, so as to guide the "drip" clear of the edges of the cream-receptacle. The tray i consists of a flat circular bottom with an annular exterior wall. It is preferred to the cover k for the reason that its removal can be effected without risk or injury to the cream. Above the casing is neatly fitted a cover, L. The joint between the same should be provided with a rubber or other gasket, so as to effectually exclude air, and thus preserve the freezing material for a much longer time than if the same were not so protected. A vent provided with suitable plug should be made in the side or bottom of the outer casing, so as to carry off the liquid of the freezing material.

In using my invention the bottom of the outer casing, A, is first covered to a depth of about two inches with ice and rock-salt, previously broken up for the said purpose. The cream-receptacle is then placed thereupon, with the annular space around the same about equally on all sides. The cream-receptacle is then filled, if same has not been previously done, and the cover G placed thereupon. The freezing-receptacles are then filled with broken ice and salt, as shown, after which the cover G is removed or not, as desired, when the tray i or cover k is placed on top of the receptacle B, and the same loaded with ice or ice and salt. Finally, the outer cover, L, with its gasket or other air-tight lining, is placed over all, and the freezer placed aside and covered with a blanket or other suitable material to exclude heat. To remove the frozen cream the receptacle B is withdrawn from the freezer, and then dipped in tepid or hot water, so as to loosen the same, when it is turned out in a body.

Having described my invention, what I claim as new, and desire to secure by Letters Patent, is—

The combination, in an ice-cream freezer, of an outer casing, A, annular cream-receptacle B, having open passage through the same, the cover G, with central opening, the tray $i$, and air-tight outer cover, L, substantially as set forth.

In testimony whereof I hereunto sign my name.

HEZEKIAH O'NEAL KING.

In presence of—
C. W. PARKER,
G. T. BADEAUX.